United States Patent
Lee

(10) Patent No.: US 6,647,023 B1
(45) Date of Patent: Nov. 11, 2003

(54) VOICE CODING CONVERSION CIRCUIT BETWEEN OFFICE EXCHANGE AND ISDN KEYPHONE SYSTEM

(75) Inventor: Hyung-Gon Lee, Taegu-Kwangyeokshi (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/468,827

(22) Filed: Dec. 22, 1999

(30) Foreign Application Priority Data

Dec. 30, 1998 (KR) ........................................ 1998-60820

(51) Int. Cl.[7] .................................................. H04J 3/16
(52) U.S. Cl. ........................................ 370/466; 370/522
(58) Field of Search ................................ 370/466–468, 370/359, 384–395, 476–478, 401, 469, 474, 376–380, 523, 267, 357, 498, 435, 261–268, 287–291, 522; 375/222, 340, 231, 242, 254, 295, 319, 285; 704/200; 709/234

(56) References Cited

U.S. PATENT DOCUMENTS

| | | | |
|---|---|---|---|
| 4,403,322 A | | 9/1983 | Kato et al. |
| 4,747,096 A | | 5/1988 | Piasecki et al. |
| 4,970,723 A | * | 11/1990 | Lin ............................. 370/359 |
| 5,060,227 A | | 10/1991 | Finley et al. |
| 5,239,542 A | | 8/1993 | Breidenstein et al. |
| 5,287,106 A | * | 2/1994 | Senderowicz et al. ...... 341/118 |
| 5,467,395 A | | 11/1995 | Izumi |
| 5,652,782 A | | 7/1997 | Hughes-Hartogs |
| 6,212,228 B1 | * | 4/2001 | Vlajnic ........................ 375/222 |
| 6,215,778 B1 | * | 4/2001 | Lomp et al. ................. 370/335 |
| 6,233,248 B1 | * | 5/2001 | Sautter et al. .............. 370/465 |

OTHER PUBLICATIONS

Semiconductor Technical Data(MC145484/D), Motolora, Inc. 1997.
Technical Data Sheet for PEB2054 [extended PCM Interface Controller –Small (EPIC–S)], Shiemens Aktlengesellschaft.
Technical Data Sheets(CUSTOM IC, SMS–9303), Samsung Electronics Co., Ltd.

* cited by examiner

Primary Examiner—Chi Pham
Assistant Examiner—Prenell Jones
(74) Attorney, Agent, or Firm—Robert E. Bushnell, Esq.

(57) ABSTRACT

A circuit for converting a voice coding mode of a basic rate interfacing (BRI) card in an ISDN (Integrated Service Digital Network) keyphone system according to a voice coding mode of an office exchange. A PCM (Pulse Code Modulation) coding conversion circuit between an ISDN keyphone system and an office exchange, including an A/μ-Law converter for converting the voice coding mode of the PCM data output from the ISDN keyphone system to an A-Law voice coding mode or a μ-Law voice coding mode according to a coding mode of the office exchange and for converting the voice coding mode of the PCM data input to the ISDN keyphone system to an A-Law voice coding mode or a μ-Law voice coding mode according to a coding mode of the ISDN or keyphone system, in response to a control signal output from a central processing unit so that a voice coding mode of the office exchange is matched to a voice coding mode of the ISDN keyphone system.

12 Claims, 2 Drawing Sheets

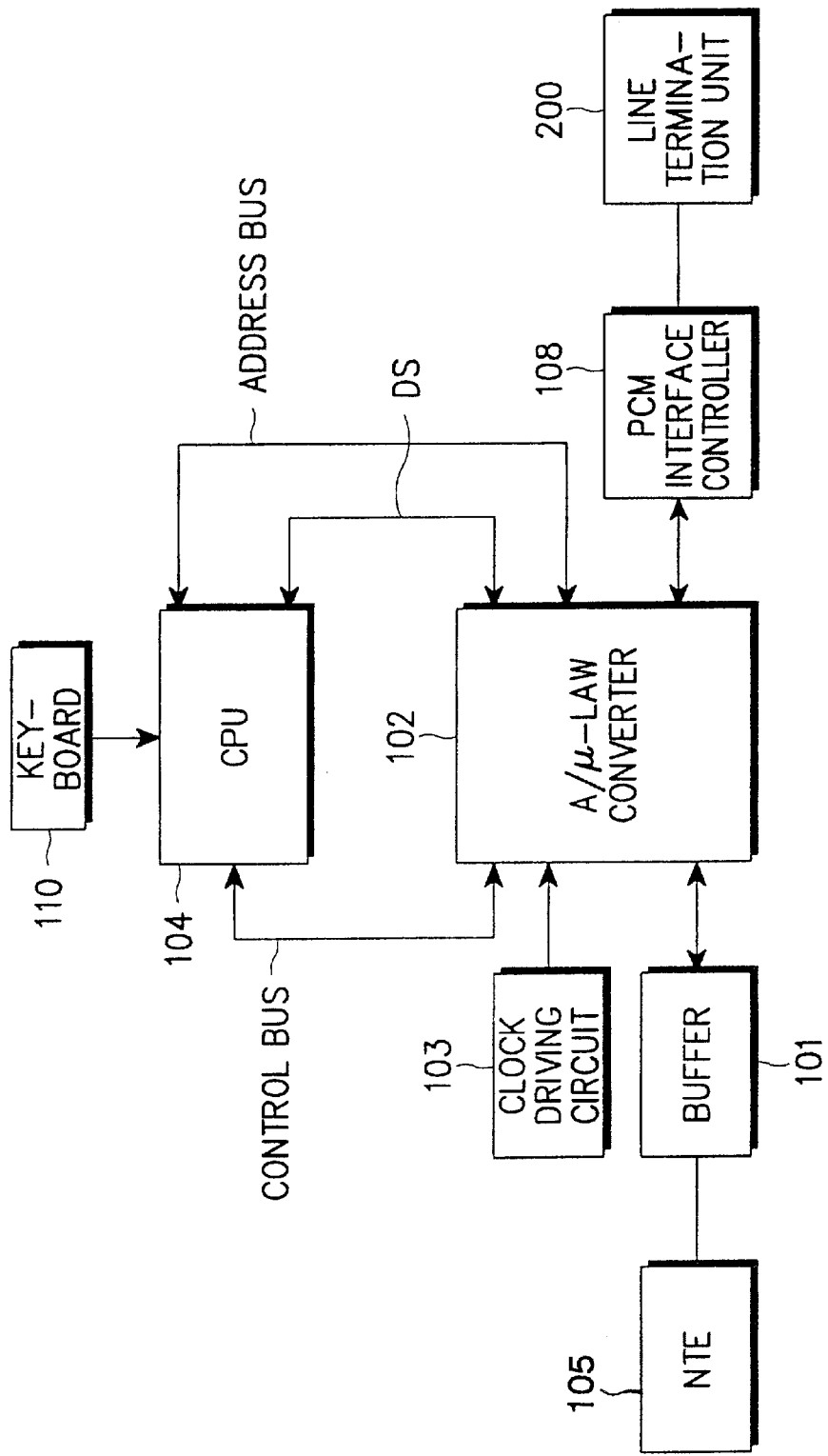

VOICE CODING CONVERSION CIRCUIT BETWEEN OFFICE EXCHANGE AND ISDN KEYPHONE SYSTEM

CLAIM OF PRIORITY

This application makes reference to, incorporates the same herein, and claims all benefits accruing under 35 U.S.C §119 from an application entitled Voice Coding Conversion Circuit Between Office Exchange And ISDN Keyphone System filed in the Korean Industrial Property Office on Dec. 30, 1998 and assigned Serial No. 98-60820.

BACKGROUND OF THE INVENTION

1. Field of the Invention

The present invention relates generally to a voice coding conversion circuit between an office exchange and an ISDN (Integrated Service Digital Network) keyphone system, and in particular, to a voice coding conversion circuit for converting an $\mu$-Law or A-Law voice coding mode of an ISDN keyphone system, supported during basic rate interfacing (BRI), to an A-Law or $\mu$-Law (Mu-Law) voice coding mode, respectively, according to a voice coding mode of an office exchange.

2. Description of the Related Art

FIG. 1 shows a block diagram of an ISDN system. Referring to FIG. 1, an ISDN keyphone system 100 is connected to an office exchange 300 via a line termination unit 200. Further, the ISDN keyphone system 100 is connected to a network termination equipment NTE, an intermediate multiplexer IMUX, a primary multiplexer PMUX, and primary network termination equipment PNTE. In the ISDN keyphone system 100 of FIG. 1, a voice coding mode of a BRI card is generally matched to a voice coding mode of the office exchange 300. For example, an office exchange using A-Law voice coding requires an ISDN keyphone system using A-Law voice coding, and an office exchange using $\mu$-Law voice coding requires an ISDN keyphone system using $\mu$-Law voice coding. Thus it has been necessary to replace the whole ISDN keyphone system using A-Law voice coding with an ISDN keyphone system using $\mu$-Law voice coding when an office exchange requires $\mu$-Law voice coding, and it has been necessary to replace the whole ISDN keyphone system using $\mu$-Law voice coding with an ISDN keyphone system using A-Law voice coding when an office exchange requires A-Law voice coding.

Of interest to the present invention, and incorporated herein, are: U.S. Pat. No. 5,467,395 to Michihiro Izumi and entitled Telephone Exchange Apparatus which discusses an ISDN system utilizing $\mu$-Law voice coding; and U.S. Pat. No. 4,747,096 to Joseph Piasecki et al. entitled Combination TASI and ADPCM Apparatus, U.S. Pat. No. 4,403,322 to Takao Kato et al. entitled Voice Signal Converting Device, U.S. Pat. No. 5,060,227 to Roger W. Finley et al. entitled Digital Telephone Switch With Simultaneous Dual PCM Format Compatibility and U.S. Pat. No. 5,239,542 to Charles J. Breidenstein et al. entitled Time Division Multiplex Switching System For Interconnecting Telephone Circuits Which Operate In Accordance With Different Signalling Systems And Call Formats each of which disclose A/$\mu$-Law conversion.

SUMMARY OF THE INVENTION

It is, therefore, an object of the present invention to provide a circuit for converting a voice coding mode of a BRI card in an ISDN keyphone system according to a voice coding mode of an office exchange.

To achieve the above object, there is provided a circuit for switching PCM voice coding between an ISDN keyphone system and an office exchange. The circuit comprises a controller for generating a control signal for controlling conversion of a voice coding mode of PCM data received s from the ISDN keyphone system to an A-Law voice coding mode or a $\mu$-Law voice coding mode according to a coding mode of the office exchange; and an A/$\mu$-Law converter for converting the voice coding mode of the PCM data according to the control signal output from the controller so that a voice coding mode of the PCM data output from the ISDN keyphone system matches to a voice coding mode office exchange, and the voice coding mode of the PCM data output by the office exchange matches to a voice coding mode of the ISDN keyphone system. An operator inputs a specific code using a keyboard in an ISDN keyphone system according to a voice coding mode of the office exchange. The controller then provides the A/$\mu$-Law converter with a control signal so that a voice coding mode of the PCM data output from the office exchange and input to the ISDN keyphone system is matched to a voice coding mode of the ISDN keyphone system and a voice coding mode of the PCM data output from the ISDN keyphone system and input to the office exchange is matched to a voice coding mode of the office exchange.

Additionally, the controller then provides the A/$\mu$-Law converter with a control signal so that a voice coding mode of the PCM data is not converted when the voice coding mode of the ISDN keyphone system and a voice coding mode of the office exchange already match.

BRIEF DESCRIPTION OF THE DRAWINGS

The above and other objects, features and advantages of the present invention will become more apparent from the following detailed description when taken in conjunction with the accompanying drawings in which:

FIG. 2 is a block diagram illustrating a voice coding conversion circuit according to an embodiment of the present invention.

DETAILED DESCRIPTION OF THE PREFERRED EMBODIMENT

Figure 1:
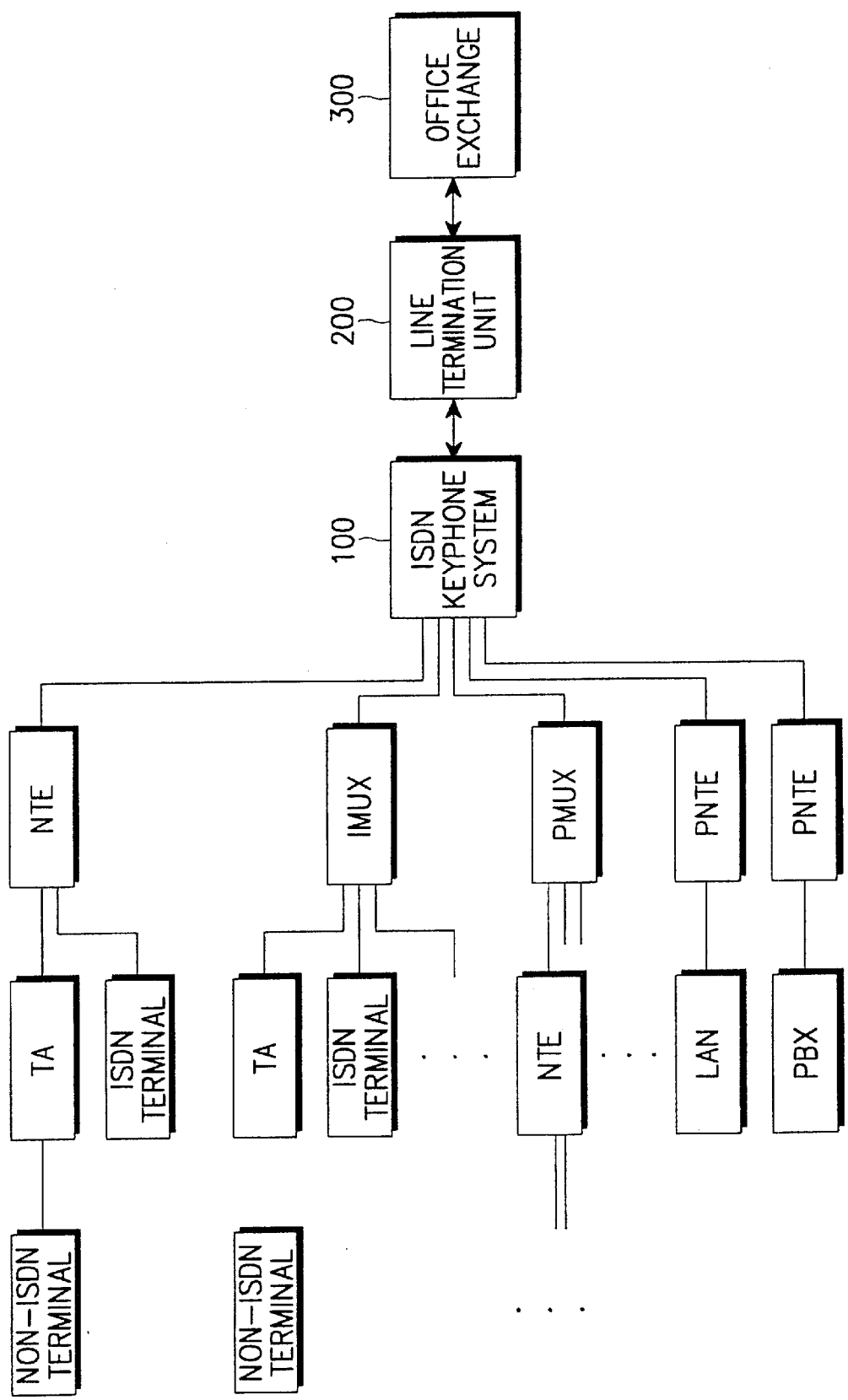
FIG. 1 is a block exemplary diagram illustrating the connection between an ISDN keyphone system and an office exchange.

A preferred embodiment of the present invention will be described herein below with reference to the accompanying drawings. In the following description, well-known functions or constructions are not described in detail since they would obscure the invention in unnecessary detail.

FIG. 2 shows a voice coding conversion circuit according to an embodiment of the present invention. Referring to FIG. 2, a buffer 101 buffers PCM (Pulse Code Modulation) data received from a network termination equipment (NTE) 105 connected to, but not shown, an ISDN terminal or a non-ISDN terminal. A PCM interface controller 108 interfaces with a line termination unit 200 connected to the office exchange (not shown), so as to transmit and receive PCM data to/from an ISDN analog subscriber at a required time slot. An A/$\mu$-Law converter 102 interposed between the buffer 101 and the PCM interface controller 108. The A/$\mu$-Law converter 102 converts $\mu$-Law PCM data input from an ISDN keyphone system to A-Law PCM data when an office exchange uses an A-Law voice coding mode, and converts the A-Law PCM data input from the office exchange a µ-Law PCM data when the ISDN keyphone system uses a µ-Law voice coding mode.

Additionally, the A/µ-Law converter 102 converts A-Law PCM data input from an ISDN keyphone system to µ-Law PCM data when an office exchange uses an µ-Law voice coding mode, and converts the µ-Law PCM data input from the office exchange an A-Law PCM data when the ISDN keyphone system uses an A-Law voice coding mode.

Further, the A/µ-Law converter 102 performs no conversion when the voice coding mode of the ISDN keyphone system and the voice coding mode of the office exchange match.

A clock driving circuit 103 provides: a frame sync signal and a fundamental clock signal to the A/µ-Law converter 102. A central processing unit (CPU) 104 connected to the A/µ-Law converter 102, generates a control signal for designating a voice coding mode according to a voice coding mode of the office exchange, so as to convert the PCM data input and output to/from the A/µ-Law converter 102 in the designated voice coding mode.

In the meantime, the readily available PEB-2054 (Extended PCM Interface Controller-Small (EPIC-S)) by Siemens, German, may be used for the PCM interface controller 108, and the readily available SMS-9303 IC by Samsung Electronics, Rep. of Korea, is used for the A/µ-Law converter 102.

A detailed description of the preferred embodiment of the invention will now be made with reference to a combination of FIGS. 1 and 2, taking in to account that the A/µ-Law converter 102 utilizes Samsung's SMS-9303 IC.

The CPU 104 controls the overall operation of the ISDN keyphone system 100. A keyboard 110 inputs various commands, and in particular, inputs a specific code according to whether the office exchange 300 uses A-Law voice coding or µ-Law voice coding. Upon receipt of the specific code from the keyboard 110, the CPU 104 provides the A/µ-Law converter 102 with a control signal for converting the PCM data in a corresponding voice coding mode. The clock driving circuit 103 provides a fundamental clock signal and a frame sync signal for driving the A/µ-Law converter 102.

When the office exchange 300 uses A-Law voice coding and the ISDN keyphone system uses µ-Law voice coding, the CPU 104 provides, for example, an 8-bit control signal (D0–D7, not separately shown) over data bus DS to the A/µ-Law converter 102 such that data bit D7 has a logic value of "1", data bit D6 has a logic value of "0", data bit D3 has a logic value of "1" and data bit D2 has a logic value of "0".

However, when the office exchange 300 uses µ-Law voice coding and the ISDN keyphone system uses A-Law voice coding, the CPU 104 provides, for another example, the 8-bit control signal over data bus DS to the A/µ-Law converter 102 such that data bit D7 has a logic value of "0", data bit D6 has a logic value of "1", data bit D3 has a logic value of "0" and data bit D2 has a logic value of "1".

When the voice coding mode of the ISDN keyphone system and the voice coding mode of the office exchange match the CPU 104 provides, for a further example, the 8-bit control signal over data bus DS to the A/µ-Law converter 102 such that data bits D7, D6, D3 and D2 each have a logic value of "1".

Therefore, regardless of the PCM data format of the office exchange 300 and the ISDN keyphone system, passing the PCM interface controller 108 and the buffer 101, the A/µ-Law converter 102 converts the PCM data to the proper the voice coding mode. Accordingly, it is not necessary to replace the overall ISDN keyphone system, even though there may be a difference between the office exchange 300 and the ISDN keyphone system 100 voice coding modes. In this manner, the ISDN keyphone system can be interlocked with the office exchanges in various environments.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A pulse code modulation (PCM) coding conversion circuit between an integrated service digital network (ISDN) keyphone system and an office exchange, comprising:

an A/µ-Law converter converting A-law to µ-Law and converting µ-law to A-law by converting PCM data output by said ISDN keyphone system to PCM data corresponding to a voice coding mode of said office exchange and for converting PCM data input to said ISDN keyphone system from said office exchange to PCM data corresponding to a voice coding mode of said ISDN keyphone system;

a controller for generating a control signal for controlling said A/µ-Law converter; and a keyboard for inputting a specific command to said controller to enable said controller to generate said control signal for controlling said A/µ-Law converter.

2. The circuit as set forth in claim 1, said controller generating a control signal for controlling said A/µ-Law converter to convert µ-Law PCM data input from said ISDN keyphone system to A-Law PCM data when said office exchange uses an A-Law voice coding mode, and to convert A-Law PCM data input from the office exchange to µ-Law PCM data when the ISDN keyphone system uses a µ-Law voice coding mode.

3. The circuit as set forth in claim 1, said controller generating a control signal for controlling said A/µ-Law converter to convert A-Law PCM data input from said ISDN keyphone system to µ-Law PCM data when the office exchange uses a µ-Law voice coding mode, and converts µ-Law PCM data input from the office exchange to A-Law PCM data when the ISDN keyphone system uses an A-Law voice coding mode.

4. The circuit as set forth in claim 1, said controller generating a control signal for controlling said A/µ-Law converter to perform no conversion when the voice coding mode of the ISDN keyphone system and the voice coding mode of the office exchange match.

5. The circuit as set forth in claim 1, further comprising:
network termination equipment connected to an ISDN terminal or non-ISDN terminal via said ISDN keyphone system;
a buffer for buffering PCM data received from the network termination equipment prior to passing said PCM data to said A/µ-Law converter;
a line termination unit connected to the office exchange;
a PCM interface controller for interfacing with the line termination unit, so as to transmit and receive PCM data at a required time slot; and
a clock driving circuit for providing a frame sync signal and a fundamental clock signal to the A/µ-Law converter.

6. The circuit as set forth in claim 5, said controller generating a control signal for controlling said A/μ-Law converter to convert μ-Law PCM data input from said ISDN keyphone system to A-Law PCM data when said office exchange uses an A-Law voice coding mode, and to convert A-Law PCM data input from the office exchange to μ-Law PCM data when the ISDN keyphone system uses a μ-Law voice coding mode.

7. The circuit as set forth in claim 5, said controller generating a control signal for controlling said A/μ-Law converter to convert A-Law PCM data input from said ISDN keyphone system to μ-Law PCM data when the office exchange uses a μ-Law voice coding mode, and converts μ-Law PCM data input from the office exchange to A-Law PCM data when the ISDN keyphone system uses an A-Law voice coding mode.

8. The circuit as set forth in claim 5, said controller generating a control signal for controlling said A/μ-Law converter to perform no conversion when the voice coding mode of the ISDN keyphone system and the voice coding mode of the office exchange match.

9. A voice coding conversion circuit between an integrated service digital network (ISDN) keyphone system and an office exchange in an ISDN system having a line termination unit interposed between the ISDN keyphone system and the office exchange, a network termination equipment (NTE) and an intermediate multiplexer (IMUX) connected to the ISDN keyphone system, a primary multiplexer (PMUX) and a primary network termination equipment (PNTE), comprising:

- a buffer for buffering pulse code modulation (PCM) data received from the network termination equipment connected to an ISDN terminal or a non-ISDN terminal via said ISDN keyphone system;
- a PCM interface controller for interfacing with a line termination unit connected to the office exchange, so as to transmit and receive PCM data to/from an ISDN analog subscriber at a required time slot;
- an A/μ-Law converter interposed between the buffer and the PCM interface controller, for converting PCM data output by said ISDN keyphone system to PCM data corresponding to a voice coding mode of said office exchange and for converting PCM data input to said ISDN keyphone system from said office exchange to PCM data corresponding to a voice coding mode of said ISDN keyphone system;
- a clock driving circuit for providing a frame sync signal and a fundamental clock signal to the A/μ-Law converter;
- a central processing unit connected to the A/μ-Law converter, for generating a control signal for designating a voice coding mode according to a voice coding mode of the office exchange, so as to convert the PCM data input and output to/from the A/μ-Law converter in the designated voice coding mode; and
- a keyboard for inputting a specific command to said central processing unit to enable said central processing unit to generate said control signal for controlling said A/μ-Law converter.

10. The circuit as set forth in claim 9, said central processing unit generating a control signal for controlling said A/μ-Law converter to convert μ-Law PCM data input from said ISDN keyphone system to A-Law PCM data when said office exchange uses an A-Law voice coding mode, and to convert A-Law PCM data input from the office exchange to μ-Law PCM data when the ISDN keyphone system uses a μ-Law voice coding mode.

11. The circuit as set forth in claim 9, said central processing unit generating a control signal for controlling said A/μ-Law converter to convert A-Law PCM data input from said ISDN keyphone system to μ-Law PCM data when the office exchange uses a μ-Law voice coding mode, and converts μ-Law PCM data input from the office exchange to A-Law PCM data when the ISDN keyphone system uses an A-Law voice coding mode.

12. The circuit as set forth in claim 9, said central processing unit generating a control signal for controlling said A/μ-Law converter to perform no conversion when the voice coding mode of the ISDN keyphone system and the voice coding mode of the office exchange match.

* * * * *